United States Patent
Shin et al.

(10) Patent No.: US 7,447,435 B2
(45) Date of Patent: Nov. 4, 2008

(54) PASSIVE OPTICAL NETWORK

(75) Inventors: Hong-Seok Shin, Suwon-si (KR);
Du-Chang Heo, Suwon-si (KR);
Chang-Sup Shim, Seoul (KR);
Seong-Taek Hwang, Pyeongtaek-si (KR)

(73) Assignee: Samsung Electronics, Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 365 days.

(21) Appl. No.: 11/195,437

(22) Filed: Aug. 2, 2005

(65) Prior Publication Data

US 2006/0115269 A1    Jun. 1, 2006

(30) Foreign Application Priority Data

Dec. 1, 2004    (KR) ............................... 2004-99906

(51) Int. Cl.
*H04J 14/02* (2006.01)
*H04B 10/00* (2006.01)

(52) U.S. Cl. .............................. 398/90; 398/63; 398/72; 398/168

(58) Field of Classification Search .................. 398/66, 398/67, 68, 70, 71, 72, 63, 90, 168, 169
See application file for complete search history.

(56) References Cited

U.S. PATENT DOCUMENTS 5,608,565 A * 3/1997 Suzuki et al. ............... 359/237
5,991,058 A * 11/1999 Feuer et al. ................. 398/72
6,650,840 B2 * 11/2003 Feldman ..................... 398/21
2007/0165688 A1 * 7/2007 Lee et al. .................... 372/71

FOREIGN PATENT DOCUMENTS

| | | |
|---|---|---|
| JP | 2002-217488 | 8/2002 |
| JP | 2004-015027 | 1/2004 |
| JP | 2004-159328 | 6/2004 |
| JP | 2004-214311 | 7/2004 |
| JP | 2004-222304 | 8/2004 |
| JP | 2004-312675 | 11/2004 |
| KR | 2003-65632 | 8/2003 |
| WO | WO 03/63401 | 7/2003 |

* cited by examiner

*Primary Examiner*—Christina Y Leung
(74) *Attorney, Agent, or Firm*—Cha & Reiter, LLC

(57) ABSTRACT

Disclosed is a passive optical network comprising a central office including a plurality of first reflective semiconductor optical amplifiers of a quantum-dot type, each of which generates a wavelength-seeded downstream optical signal on a downstream channel of a corresponding wavelength, a plurality of optical network units each of which includes a second reflective semiconductor optical amplifier of a multi-quantum-well type, the second reflective semiconductor optical amplifier generating a wavelength-seeded upstream optical signal on an upstream channel of a corresponding wavelength and a remote node for outputting the downstream optical signals to corresponding optical network units, and multiplexing and outputting the upstream optical signals to the central office.

8 Claims, 3 Drawing Sheets

PASSIVE OPTICAL NETWORK

CLAIM OF PRIORITY

This application claims to the benefit of the earlier filing date, pursuant to 35 U.S.C. 119(a), of that patent application entitled "Passive Optical Network," filed in the Korean Intellectual Property Office on Dec. 1, 2004 and assigned Ser. No. 2004-99906, the entire contents of which are incorporated herein by reference.

BACKGROUND OF THE INVENTION

1. Field of the Invention

The present invention relates to a passive optical network, and more particularly to a passive optical network including a light source which can generate wavelength-seeded optical signals.

2. Description of the Related Art

Passive optical networks, generally, include a central office for providing a communication service, a plurality of optical network units for receiving the communication service, and at least one remote node for relaying the communication service between the central office and the optical network units. The central office and the remote node(s) are typically linked to each other through an optical fiber, and the remote node and each of the optical network units are linked to each other through a distinct optical fiber, thereby forming a double-star structure.

The conventional passive optical network typically employs a wavelength-division-multiplexing (WDM) optical communication scheme. According to the WDM passive optical network, mutually different wavelengths of light are allocated to the optical network units and data are transmitted/received by using optical signals onto which the data are loaded. Such a wavelength-division-multiplexing scheme has advantages in that it is easy to maintain security and to expand existing communication lines to include additional optical units.

The conventional passive optical network typically includes a downstream light source for generating a downstream optical signal provided from the central office to each of the optical network units, and upstream light sources for generating upstream optical signals transmitted from each of the optical network units to the central office.

The downstream and upstream light sources each include a reflective semiconductor optical amplifier and a Fabry-Perot laser capable of generating wavelength-seeded light, which have a direct modulation function.

However, the light source, typically using a wavelength-injection scheme, has a problem in that the central wavelength of a downstream or upstream optical signal moves toward a longer wavelength side due to its non-linearity characteristic of semiconductor optical amplifier and positive chirp occurring during direct modulation. The positive chirp illustrates a phenomenon in which the wavelength of an optical signal generated from a light source moves toward a longer wavelength side. Such movement in the central frequency or wavelength operates to deteriorate the performance of the whole network.

SUMMARY OF THE INVENTION

Accordingly, the present invention has been made to solve the above-mentioned problems occurring in the prior art and provides additional advantages, by providing a passive optical network of a wavelength injection scheme which can prevent loss of an optical signal due to a change in the central wavelength, by using different types of light sources.

In one embodiment, there is provided a passive optical network comprising a central office including a plurality of first reflective semiconductor optical amplifiers of a quantum-dot type, each of which generates a wavelength-seeded downstream optical signal on a downstream channel of a corresponding wavelength, a plurality of optical network units each of which includes a second reflective semiconductor optical amplifier of a multi-quantum-well type, the second reflective semiconductor optical amplifier generating a wavelength-seeded upstream optical signal on an upstream channel of a corresponding wavelength, and a remote node for outputting the downstream optical signals to corresponding optical network units, and multiplexing and outputting the upstream optical signals to the central office.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, an embodiment according to the present invention will be described with reference to the accompanying drawings. For the purposes of clarity and simplicity, a detailed description of known functions and configurations incorporated herein will be omitted as it may obscure the subject matter of the present invention.

Figure 2:
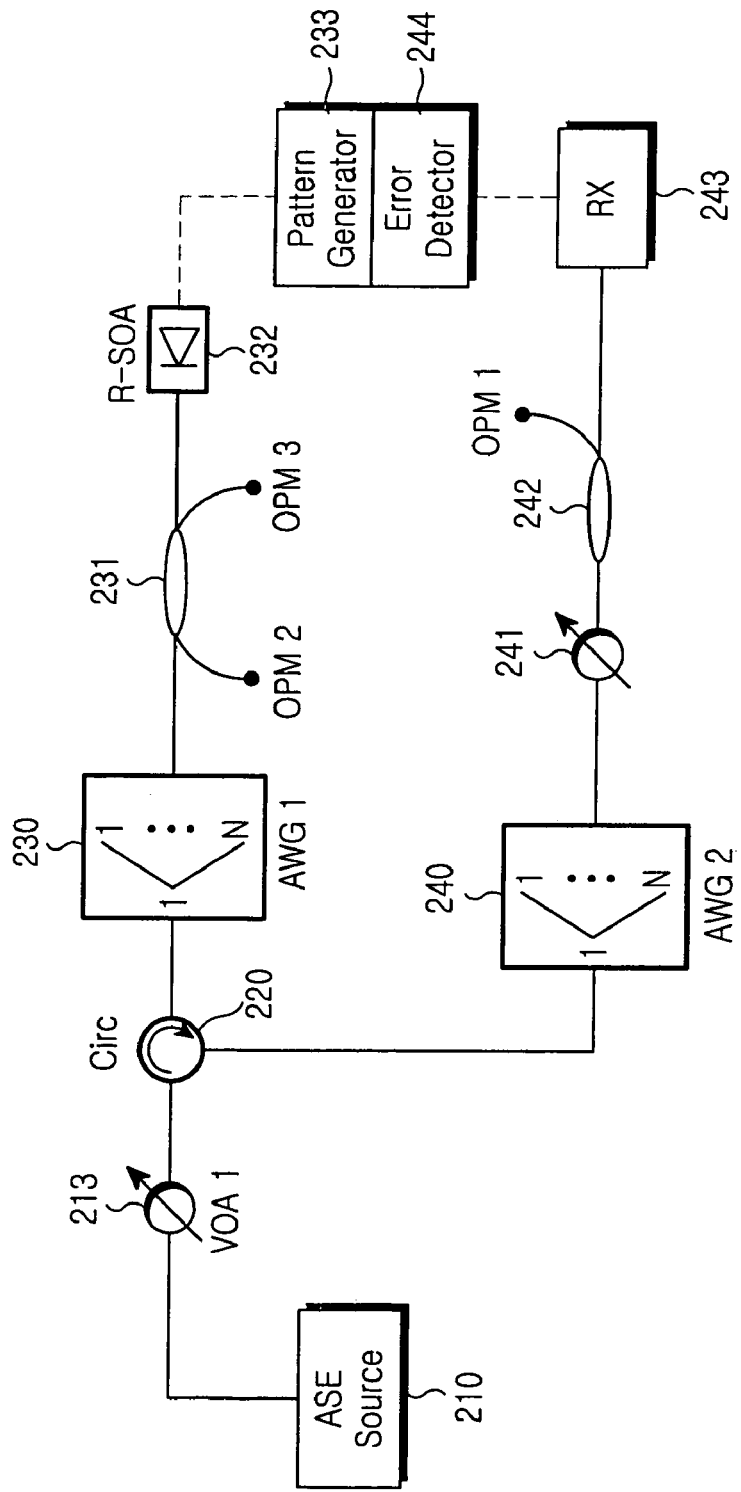
FIG. 2 is a block diagram illustrating a configuration of a test apparatus using a reflective semiconductor optical amplifier shown in FIG. 1.
Figure 3:
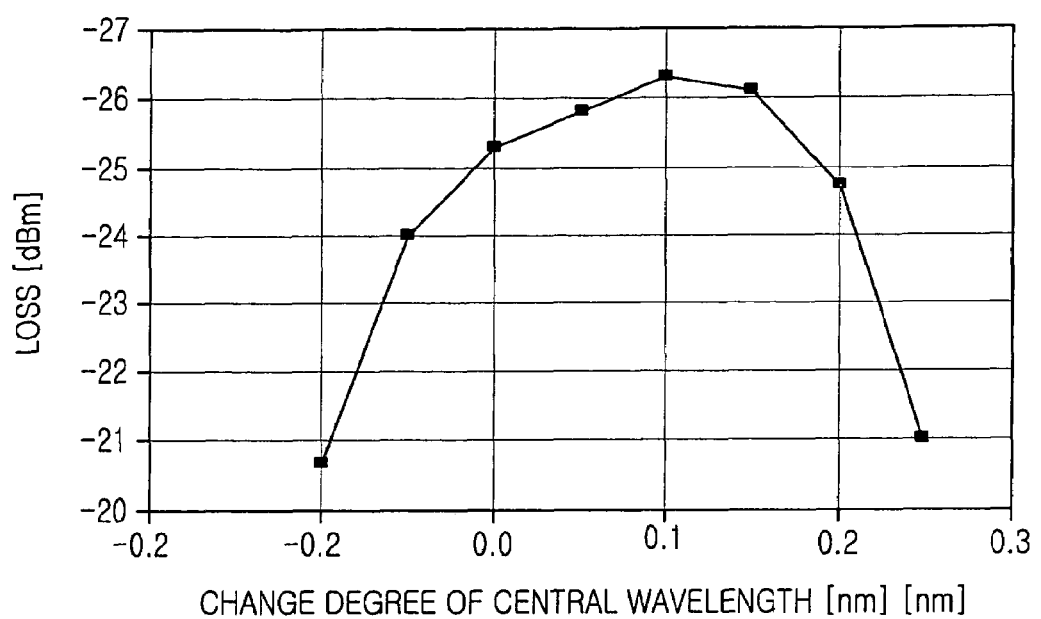
FIG. 3 is a graph for showing an optical axis alignment error and loss depending on the error, which are obtained as a result of a test using the test apparatus shown in FIG. 2.

FIG. 2 is a block diagram illustrating a test apparatus for testing the quality of communication when a multiplexer/demultiplexer demultiplexes a central wavelength of multiplexed optical signals in order for the central wavelength of each multiplexed optical signal to be offset by a known amount according to an embodiment of the present invention. FIG. 3 is a graph for showing change in loss depending on offset of the central wavelength after demultiplexing as a result of a test using the test apparatus shown in FIG. 2.

The test apparatus shown in FIG. 2 includes a broadband light source 210 for generating light having a broad wavelength band, first and second multiplexer/demultiplexers 230 and 240, a circulator 220, a reflective semiconductor optical amplifier 232, an optical detector 243, a pattern generator, an error detector 244, first and second variable optical attenuators 213 and 214, and first and second optical dividers 231 and 242.

The first multiplexer/demultiplexer 230 divides light input through the circulator 220 into a plurality of channels, each of which has a distinct wavelength, and outputs a channel having a specific wavelength from among the divided channels to the reflective semiconductor optical amplifier 232. The reflective semiconductor optical amplifier 232 generates a wavelength-seeded optical signal associated with the channel having the specific wavelength. The optical signal generated from the reflective semiconductor optical amplifier 232 passes through the first multiplexer/demultiplexer 230 and the second multiplexer/demultiplexer 240, and is detected by the optical detector 243.

FIG. 3 is a graph illustrating the change in receiver sensitivity of an optical signal as a function of the change in central wavelength of the optical signal, which is measured when the second multiplexer/demultiplexer 240 of a reception side changes the central wavelength incrementally by 0.05 nm (nanometers) on the basis of the central wavelength of the first multiplexer/demultiplexer 230. In this case, first multiplexer/demultiplexer 230 fixes the central wavelength. The reception sensitivity of the optical signal is −26.3 dBm at the point at which the central wavelength in the second multiplexer/demultiplexer 240 is offset by 0.1 nm toward a longer wavelength side from the central wavelength of the relevant optical signal. It can be understood, by those skilled in the art, that the penalty of the receiver sensitivity is minimized at this offset. The reflective semiconductor optical amplifier 232 includes a multi-quantum-well reflective semiconductor optical amplifier.

The multi-quantum-well reflective semiconductor optical amplifier moves the central wavelength of an optical signal toward the longer wavelength side from the wavelength of the first multiplexer/demultiplexer, while a quantum-dot reflective semiconductor optical amplifier moves the central wavelength of an optical signal toward a shorter wavelength side due to occurrence of negative chirp.

A passive optical network according to an embodiment of the present invention includes a central office that includes a quantum-dot reflective semiconductor optical amplifier and the optical network units include a multi-quantum-well reflective semiconductor optical amplifier locating the central wavelength at a longer wavelength side. In accordance with the principles of the invention, the central office and a remote node may offset the central wavelengths of downstream and upstream optical signals from each other to accommodate and account for the subsequent demultiplexing of the upstream and downstream optical signals. As a result, it is possible to improve the performance of upstream and downstream optical signals.

Figure 1:
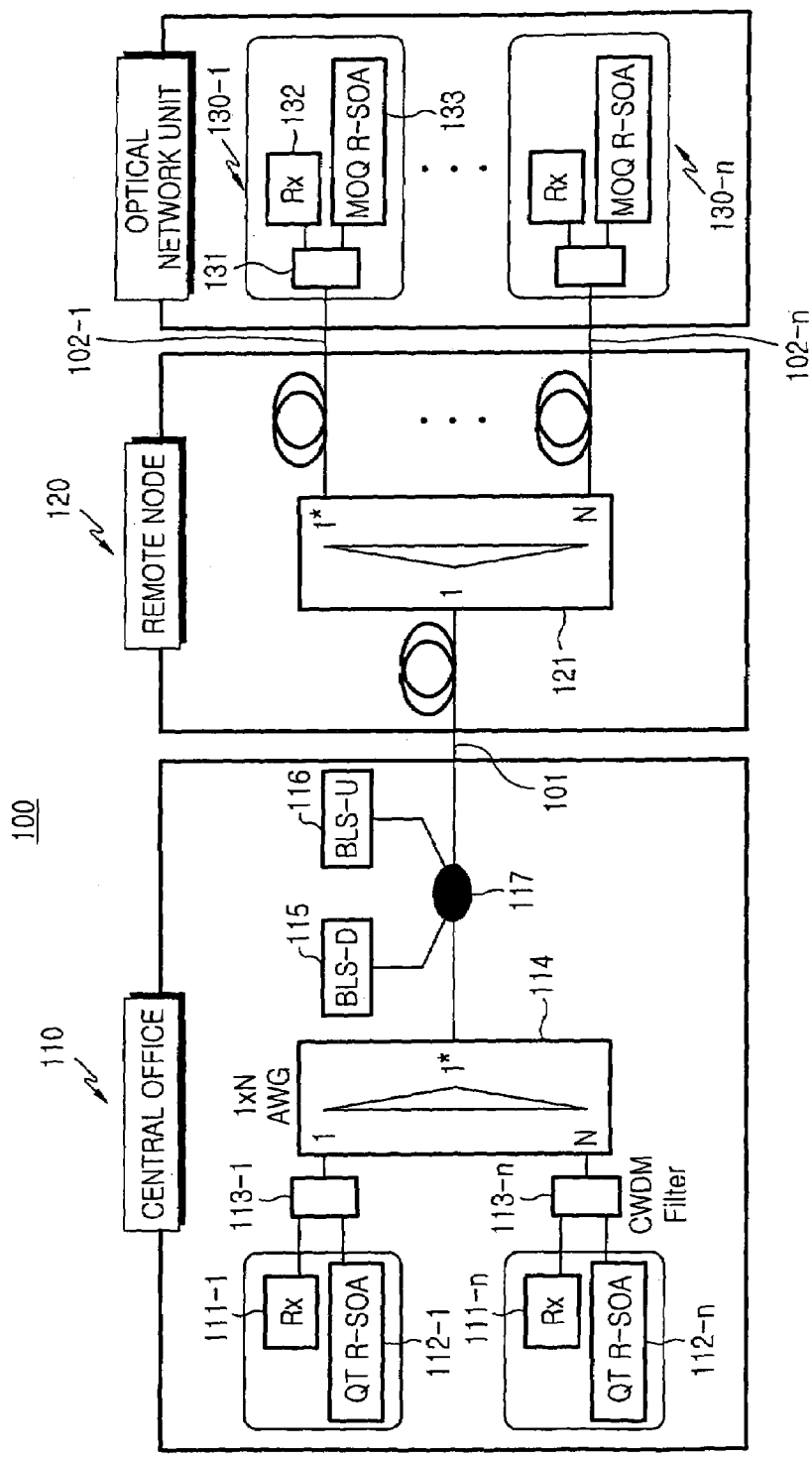
FIG. 1 is a block diagram illustrating a configuration of a passive optical network according to a preferred embodiment of the present invention.

FIG. 1 is a block diagram illustrating a configuration of a passive optical network according to a preferred embodiment of the present invention. The passive optical network 100 includes a central office 110, a plurality of optical network units 130-1 to 130-n, a remote node 120, a first optical line 101 and second optical lines 102-1 to 102-n. The central office 110 multiplexes and outputs wavelength-seeded downstream optical signals, and each of the optical network units 130-1 to 130-n generates a wavelength-seeded upstream optical signal. The remote node 120 multiplexes and outputs the upstream optical signals to the central office 110. The first optical line 101 links the central office 110 and the remote node 120, and the second optical lines 102-1 to 102-n link the remote node 120 and the optical network units 130-1 to 130-n, respectively.

The central office 110 includes downstream and upstream broadband light sources 115 and 116, a plurality of first reflective semiconductor optical amplifiers 112-1 to 112-n for generating wavelength-seeded downstream optical signals, a first multiplexer/demultiplexer 114, a plurality of upstream optical detectors 111-1 to 111-n, an optical divider 117, and first wavelength division multiplexers 113-1 to 113-n. The central office 110 demultiplexes multiplexed upstream optical signals to detect each of the upstream optical signals, and generates a wavelength-seeded downstream optical signal.

The downstream broadband light source 115 generates a spontaneous emission light having a broad wavelength band, which provide the seed wavelengths of the first reflective semiconductor optical amplifiers 112-1 to 112-n, and upstream broadband light source 116 generates a spontaneous emission light having a broad wavelength band, which provide the seed wavelengths of the optical network units 130-1 to 130-n.

The first multiplexer/demultiplexer 114 multiplexes and outputs the downstream optical signals to the remote node 120, and demultiplexes the multiplexed upstream optical signals so that each of the upstream optical signals may have a central wavelength offset from its original central wavelength. The demultiplexed upstream optical signals are outputted to corresponding upstream optical detectors 111-1 to 111-n.

Also, the first multiplexer/demultiplexer 114 divides the downstream light from BLS-D 115 into a plurality of different downstream channels, and outputs the divided light to corresponding first reflective semiconductor optical amplifiers 112-1 to 112-n. Each of the first reflective semiconductor optical amplifiers 112-1 to 112-n is an amplifier of a quantum-dot reflective type and generates a wavelength-seeded downstream optical signal associated with a corresponding downstream channel.

In the first reflective semiconductor optical amplifiers 112-1 to 112-n, a negative chirp phenomenon occurs, which moves the central wavelength of a generated optical signal toward a shorter wavelength side from an originally desired central wavelength position, due to direct modulation and four-wave mixing. The negative chirp phenomenon may be controlled by moving the central wavelengths of multiplexed downstream optical signals by a predetermined interval when a second multiplexer/demultiplexer demultiplexes the multiplexed downstream optical signals. In contrast, the first multiplexer/demultiplexer 114 demultiplexes the upstream optical signals so that the central wavelength of each of the upstream optical signals moves by a predetermined interval from an original central wavelength and thus compensating for a positive chirp phenomenon occurring in each of the second reflective semiconductor optical amplifiers 132-1 to 132-n as necessary.

Each of the upstream optical detectors 111-1 to 111-n detects the upstream optical signal having a corresponding wavelength from among the upstream optical signals demultiplexed by the first multiplexer/demultiplexer 114. Each of the first wavelength division multiplexers 113-1 to 113-n connects a corresponding reflective semiconductor optical amplifier 112-1 to 112-n and a corresponding upstream optical detector 111-1 to 111-n to the first multiplexer/demultiplexer 114.

The optical divider 117 is located on the first optical line and is connected to the downstream and upstream broadband light sources 115 and 116. That is, the optical divider 117 outputs the downstream light generated from the downstream broadband light source 115 to the first multiplexer/demultiplexer 114, and outputs the upstream light generated from the upstream broadband light source 116 to the remote node 120.

The remote node 120, which includes a second multiplexer/demultiplexer 121, is linked to the central office 110 by first optical line 101, and further is linked to the optical network units 130-1 to 130-n by second optical lines 102-1 to 102-n, respectively. The remote node 120 demultiplexes the in-coming signal and outputs de-multiplexed downstream optical signals to corresponding optical network units 130-1 to 130-n. Alternatively, remote node 120 multiplexes the upstream optical signals output received from the optical network units 130-1 to 130-n and outputs the multiplexed upstream optical signals to the central office 110. Also, the second multiplexer/demultiplexer 121 divides the upstream light generated by BLS-U 116 into a plurality of upstream channels having wavelengths different from each other, and outputs the divided light to corresponding optical network units 130-1 to 130-n. The second multiplexer/demultiplexer 121 demultiplexes the downstream optical signals multiplexed by the central office 110 so that each of the downstream optical signals has a central wavelength offset from its original central wavelength, and then outputs the demultiplexed downstream optical signals to the corresponding optical network units.

Each of the optical network units 130-1 to 130-n detects a downstream optical signal having a corresponding wavelength from among the downstream optical signals demultiplexed by the remote node 120, and generates a wavelength-seeded upstream optical signal on a relevant upstream channel. Each of the optical network units 130-1 to 130-n includes a second reflective semiconductor optical amplifier 133, an upstream optical detector 132 and a second wavelength division multiplexer 131. The multiplexer/demultiplexer may be an arrayed waveguide grating.

The second semiconductor optical amplifier 133 generates a wavelength-seeded upstream optical signal on a corresponding upstream channel, and includes a multi-quantum-well reflective semiconductor optical amplifier. The wavelength-seeded upstream optical signals generated by the second semiconductor optical amplifiers 133 are multiplexed by the remote node 120 and output to the central office 110.

The first multiplexer/demultiplexer 114 in the central office 110 demultiplexes the multiplexed upstream optical signals into respective upstream optical signals, each of which has a central wavelength offset from the central wavelength of a corresponding original seed source.

That is, reflective semiconductor optical amplifier light sources cause a nonlinear response, such as four-wave mixing, wherein, each of the second semiconductor optical amplifiers 133 causes a positive chirp phenomenon due to direct modulation. In this case, the wavelength of a corresponding upstream optical signal moves toward a longer wavelength side. The wavelengths of wavelength-seeded upstream optical signals generated from the second semiconductor optical amplifiers 133 are moved before the first multiplexer/demultiplexer 114, so that the deterioration of communication quality due to the spectrum distortion can be prevented thanks to the positive chirp phenomenon.

The first optical line 101 links the central office 110 and the remote node 120, and each of the second optical lines 102-1 to 102-n links a corresponding optical network unit 130-1 to 130-n and the remote node 120. The first and second optical lines 101 and 102-1 to 102-n may include an optical fiber.

As described above, according to a passive optical network according to an embodiment of the present invention, the central office and each optical network unit use different types of reflective semiconductor optical amplifiers, each multiplexed downstream and upstream optical signals is demultiplexed so as to have a central wavelength offset by a predetermined interval from its original central wavelength, so that loss of the optical signals can be prevented.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:
1. A passive optical network comprising:
a central office including a plurality of first reflective semiconductor optical amplifiers of a quantum-dot type, each of which generates a wavelength-seeded downstream optical signal on a downstream channel of a corresponding wavelength;
a plurality of optical network units each of which includes a second reflective semiconductor optical amplifier of a multi-quantum-well type, the second reflective semiconductor optical amplifier generating a wavelength-seeded upstream optical signal on an upstream channel of a corresponding wavelength; and
a remote node for demultiplexing and outputting the downstream optical signals to corresponding optical network units, and multiplexing and outputting the upstream optical signals to the central office, wherein the central office comprises:
a downstream broadband light source for generating a downstream seed light;
an upstream broadband light source for generating an upstream seed light;
a plurality of upstream optical detectors for detecting upstream optical signals having corresponding wavelengths;
a first multiplexer/demultiplexer for:
demultiplexing the upstream optical signals such that each of the upstream optical signals has a central wavelength offset from its original central wavelength and outputting the demultiplexed upstream optical signals to corresponding upstream optical detectors, and
dividing the downstream seed light into a plurality of downstream channels having different wavelengths and outputting the divided downstream seed light to corresponding first reflective semiconductor optical amplifiers;
a plurality of first wavelength division multiplexers for connecting the ports of first multiplexer/demultiplexer to each of the upstream optical detectors and the first reflective semiconductor optical amplifiers; and
an optical divider located between the first multiplexer/demultiplexer and the remote node and connected to the downstream and upstream broadband light sources.

2. The passive optical network as claimed in claim 1,
wherein each one of the plurality of upstream optical detectors in the central office for detecting a corresponding upstream optical signal multiplexed by the remote node and subsequently demultiplexed by said first multiplexer/demultiplexer; and
wherein each of the optical network units includes an optical detector, and
wherein each of the optical network units includes a second wavelength division multiplexer for connecting the second reflective semiconductor optical amplifier and the optical detector in said each optical network unit to a corresponding port of the remote node.

3. The passive optical network as claimed in claim 1, further comprising:
a first optical line for linking the central office and the remote node; and a plurality of second optical lines for linking the remote node and each of the optical network units.

4. The passive optical network as claimed in claim 1, wherein the remote node farther comprises:
a second multiplexer/demultiplexer which de-multiplexes the downstream optical signals so that each of the downstream optical signals has a central wavelength offset from its original central wavelength and outputs the de-multiplexed downstream signals optical to tile corresponding optical network units;

wherein the second multiplexer/demultiplexer includes an arrayed waveguide grating.

5. A passive optical network comprising:

a central office including a plurality of first reflective semiconductor optical amplifiers of a quantum-dot type, each of which generates a wavelength-seeded downstream optical signal on a downstream channel of a corresponding wavelength;

a plurality of optical network units each of which includes a second reflective semiconductor optical amplifier of a multi-quantum-well type, the second reflective semiconductor optical amplifier generating a wavelength-seeded upstream optical signal on an upstream channel of a corresponding wavelength; and a remote node for demultiplexing and outputting the downstream optical signals to corresponding optical network units, and multiplexing and outputting the upstream optical signals to the central office, wherein the remote node further comprises:

a multiplexer/demultiplexer which de-multiplexes the downstream optical signals so that each of the downstream optical signals has a central wavelength offset from its original central wavelength and outputs the dc-multiplexed downstream optical signals to corresponding optical network units.

6. The passive optical network as claimed in claim 5, further comprising:

a first optical line for linking the central office and the remote node; and a plurality of second optical lines for linking the remote node and each of the optical network units.

7. The passive optical network as claimed in claim 5, wherein the multiplexer/demultiplexer includes an arrayed waveguide grating.

8. A central office suitable for use in a passive optical network, the central office comprising:

a plurality of first reflective semiconductor optical amplifiers of a quantum-dot type, each of which generates a wavelength-seeded downstream optical signal on a downstream channel of a corresponding wavelength;

a downstream broadband light source for generating a downstream seed light;

an upstream broadband light source for generating an upstream seed light;

a plurality of upstream optical detectors for detecting upstream optical signals having corresponding wavelengths;

a first multiplexer/demultiplexer for:

demultiplexing the upstream optical signals such That each of the upstream optical signals has a central wavelength offset from its original central wavelength and outputting the demultiplexed upstream optical signals to corresponding upstream optical detectors, and dividing the downstream light into a plurality of downstream channels having different wavelengths and outputting the divided downstream light to corresponding first reflective semiconductor optical amplifiers;

a plurality of first wavelength division multiplexers for connecting the ports of first multiplexer/demultiplexer to each of the upstream optical detectors and the first reflective semiconductor optical amplifiers; and an optical divider located between the first multiplexer/demultiplexer and the remote node and connected to the downstream and upstream broadband light sources.

* * * * *